(12) United States Patent
Shaibani et al.

(10) Patent No.: US 7,327,907 B2
(45) Date of Patent: Feb. 5, 2008

(54) OPTICAL SENSOR FIBER WITH PROTECTIVE JACKETING LAYERS

(75) Inventors: Sanan Shaibani, Woodland Hills, CA (US); Joseph Krystkowiak, Moorpark, CA (US); John Mansell, Thousand Oaks, CA (US); Akbar Arab-Sadenghabadi, Simi Valley, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/966,751

(22) Filed: Oct. 14, 2004

(65) Prior Publication Data

US 2006/0083463 A1 Apr. 20, 2006

(51) Int. Cl.
*G02B 6/00* (2006.01)
*G02B 6/34* (2006.01)

(52) U.S. Cl. .............................. 385/12; 385/13; 385/37
(58) Field of Classification Search ................ 385/106, 385/109, 126–128, 12, 13, 37
See application file for complete search history.

(56) References Cited

U.S. PATENT DOCUMENTS

| 6,463,684 | B2 * | 10/2002 | Jang ............................... 38/37 |
| 6,563,985 | B2 * | 5/2003 | Yin et al. ...................... 385/37 |
| 6,751,380 | B1 * | 6/2004 | Imamura et al. ............... 385/37 |
| 2003/0219190 | A1 * | 11/2003 | Pruett .......................... 385/12 |
| 2004/0228594 | A1 * | 11/2004 | Andre et al. ................. 385/128 |

\* cited by examiner

*Primary Examiner*—Michelle R. Connelly-Cushwa
(74) *Attorney, Agent, or Firm*—Tarolli, Sundheim, Covell & Tummino LLP

(57) ABSTRACT

Optical fibers, especially those having a core layer, a cladding layer over the core layer, FBG's formed in the core layer, the cladding layer, or both, a buffer layer over the cladding layer, and an outer jacketing layer.

12 Claims, 1 Drawing Sheet

OPTICAL SENSOR FIBER WITH PROTECTIVE JACKETING LAYERS

FIELD OF THE INVENTION

The field of this invention is optical fibers, especially optical fibers that comprise a core layer, a cladding layer over the core layer, and a coating layer over the cladding layer, a protective layer over the coating layer, and sensory arrays that include such optical fibers. More particularly, an optical fiber sensor array comprising one or more Fiber Bragg Gratings (FBG's), written in the core or cladding of the fibers, is over coated with a protective material, e.g., a thin plastic, specifically selected for the intended environment of the array. The protective over coating is preferably of sufficient thickness to minimize micro bending of such arrays.

Some of these arrays, e.g., geophysical arrays, interferometers and hydrophones, may include fibers having lengths in the range of a few meters up to several kilometers. These arrays may be exposed to severe environmental conditions including extremes of heat and cold and corrosive chemicals, and must therefore be robust, and resistant to deterioration under such conditions.

BACKGROUND OF THE INVENTION

Optical fibers are used extensively in sensor arrays, in part because of the ease in forming the arrays. These fibers may have a core layer, e.g., core layer made of glass, an outer cladding layer, e.g., a layer made of glass over the core, and a protective buffer coating layer over the cladding. Unfortunately, these fibers and arrays have disadvantages. Often these sensors and arrays lack adequate protection when exposed to adverse environmental conditions.

Others have disclosed placing a protective coating or buffer layer on such fibers. See U.S. Pat. No. 6,563,996, disclosing optical fibers having a protective primary coating composition including a monomer with a pendant hydroxyl function group. Such protective layers do not necessarily protect sensor arrays including them, however. For example, optical fiber pressure sensor arrays that include such optical fibers on a wrapped mandrel may have entry and exit points exposed to potential damage. Such fibers and arrays need better protection.

These fiber arrays often include Fiber Bragg Gratings (FBG's) formed in the optical fibers through transparent buffer or coating layers, as by laser etching. U.S. Pat. No. 5,620,495 discloses writing FBG's in polymer-coated optical fibers without removing the polymer coating. Alternatively, FBG's may be written in the fibers by removing the buffer or coating layer over a short distance, e.g., a few millimeters, to form a gap, then forming Bragg gratings in the gap. The gap is then closed with a patch. See also U.S. Pat. No. 4,725,110 disclosing methods for forming FBG's within fiber optics.

Such methods may degrade the protective buffer of the fiber and may not provide adequate protection in the actual operating environment, either because the coating has been formulated for transparency, or has been stripped and recoated. This invention protects fiber sensor arrays with many FBG's in arrays such as those disclosed in U.S. Pat. No. 5,987,197 and up-coats each continuous fiber array length with a protective layer.

SUMMARY OF THE INVENTION

Optical fibers that include Fiber Bragg Gratings (FBG's), written in the core or cladding of the fibers, further comprise a core layer, a cladding layer over the core layer, a coating layer over the cladding layer, and an outer jacketing layer over the buffer or coating layer. This outer jacketing layer may be uniform in thickness, and may be, for example, from about 1 to about 900 microns in thickness. The jacketing material may be made of materials such as a thermoset, a polyamide, or a thermoplastic, e.g., Hytrel®, a DuPont trademark.

Among other suitable materials are the following thermoplastics and thermosets:

THERMOPLASTICS
  Acrylonitrile butadiene styrene
  Cellulose acetate
  Cellulose acetate butyrate
  Chlorinated trifluoroethylene
  Polyacetal
  Polyamide (nylon)
  Polybutylene terephthalate
  Polycarbonate
  Polyethylene
  Polyester
  Polyimide
  Polymethylmethacrylate
  Polypropylene
  Polystyrene
  Polysulfone
  Polytetrafluoroethylene
  Polyvinyl chloride THERMOSETS
  Diallyl phthalate
  EPOXY
  Melamine formaldehyde
  Phenol formaldehyde.
  Polyester
  Urea formaldehyde Preferably, the optical fibers are made, and the Fiber Bragg Gratings (FBG's) formed, before the jacketing material is applied. The jacketing or over coat covers the fiber over its entire length, protecting both fiber and FBG's. Preferably, the over coat is uniform in thickness, homogeneous in composition and, after application, solid and substantially free of defects such as bubbles, voids, thin regions, and breaks.

The optical fibers may comprise a core layer comprising materials such as glass, a cladding layer over the core layer, where the cladding layer may comprise glass, and a coating layer over the cladding layer. The coating layer may be made of polymer. The core, cladding layer and buffer layer are of substantially uniform thickness. The diameter of the core may be about 1 to about 20 microns. The thickness of the cladding layer may be in the range of about 10 to about 200 microns. The thickness of the buffer layer may be in the range of about 20 to about 400 microns. The protective outer layer thickness may be in the range of about 1 to 900 microns.

Such optical fibers may form part of a sensor array, such as a pressure sensor array. These arrays include a mandrel with optical fiber wrapped around the mandrel. The optical fibers/mandrel assembly may also be coated with an epoxy.

To apply the outer protective layer, a hollow tube made of a substance suitable for forming the outer protective layer may be heated to the softening point, and then drawn over the outer layer, e.g., buffer layer of the optical fiber. Upon cooling, the outer jacketing layer shrinks to fit over and adhere to the buffer layer. Alternatively, a buffer layer may be drawn onto the fiber. Such a buffer coating may be applied as a liquid. Once applied, the coating cools and solidifies over the length of the fiber, encapsulating an entire sensor array. The actual kinds and methods of over coating the sensor may depend on the operating environment for the array, or on the process in which the array is expected to operate.

BRIEF DESCRIPTION OF THE DRAWINGS

The jacketed optical fibers of this invention and the assemblies including them can better be understood by reference to the drawings in which.

DETAILED DESCRIPTION OF THE DRAWINGS

Figure 1:
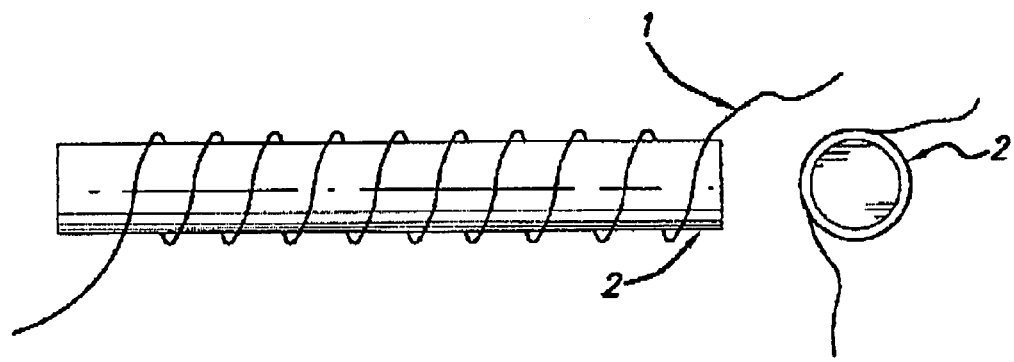
FIG. 1 shows an optical fiber wrapped around a mandrel.

FIG. 1 shows optical fiber 1 wrapped around the length of hydrophone mandrel 2. The entire mandrel may be coated with epoxy.

Figure 2:
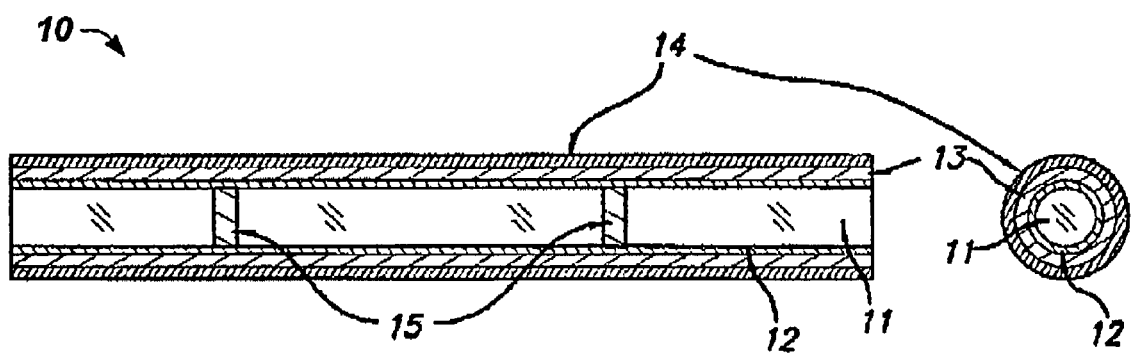
FIG. 2 shows a cross-section of an optical fiber that includes the protective outer jacket applied atop the buffer layer and atop the core and cladding of an optical fiber.

FIG. 2 shows optical fiber 10 in cross-section. Optical fiber 10 includes glass core 11, cladding 12, buffer layer 13, protective layer 14, and FBG's 15.

The invention claimed is:

1. A sensor array comprising:
an optical fiber comprising a core layer, a cladding layer over the core layer, a buffer layer over the cladding layer, an outer jacketing layer over the buffer layer, and one or more FBG's formed in the core layer, cladding layer, or both, said jacketing layer having a composition and thickness adapted to the intended use environment for said optical fiber; and
a mandrel around which the optical fiber is wound to form at least a portion of the sensor array.

2. The sensor array of claim 1 wherein said core layer is made of glass, said cladding layer is made of glass, and said jacketing layer is made of Hytrel.RTM.-curable coating.

3. The sensor array of claim 1 wherein said core layer has a thickness in the range of about 1 to about 20 microns, said cladding layer has a thickness in the range of about 10 to about 200 microns, said buffer layer has a thickness in the range of about 20 to about 400 microns, and said outer jacketing layer has a thickness in the range of about 100 to about 900 microns.

4. The sensor array of claim 1 wherein said core layer is made of glass and has a thickness in the range of about 1 to about 20 microns, said cladding layer is made of glass and has a thickness in the range of about 10 to about 200 microns, said buffer layer comprises of polymer and has a thickness in the range of about 20 to about 400 microns, and said outer jacketing layer is made of Hytrel.RTM. and has a range of about 100 to about 900 microns.

5. The sensor array of claim 1, further comprising an epoxy coating over the at least a portion of the sensor array.

6. The sensor array of claim 1, wherein the mandrel is configured as a hydrophone mandrel.

7. The method of making a sensor array comprising forming an optical fiber that includes a core layer, a cladding layer over the core layer, a buffer layer over the cladding layer, and one or more FRG's formed in the core layer, cladding layer, or both, and a jacketing layer having a composition and thickness adapted to the intended use environment for said optical fiber, comprising drawing over said buffer layer the outer jacketing layer in the form of heat-softened tubular jacketing material, cooling said jacketing material to shrink said jacketing layer onto said buffer layer, and forming said optical fiber into a sensor array, forming an epoxy layer over the sensor array.

8. The method of claim 7, wherein forming said optical fiber into a sensor array comprises wrapping said optical fiber around a hydrophone mandrel to form at least a portion of the sensor array.

9. The method of claim 7, wherein drawing over said buffer layer the outer jacketing layer comprises drawing over said buffer layer the outer jacketing layer having a thickness of about 100 microns to about 900 microns.

10. The method of making a sensor array comprising forming an optical fiber That includes a core layer, a cladding layer over the core layer, a buffer layer over the cladding layer, and one or more FBG's formed in the core layer, cladding layer, or both, and a jacketing layer having a composition and thickness adapted to the intended use environment for said optical fiber, comprising applying said jacketing layer as a liquid, allowing said jacketing layer to solidify, and forming said optical fiber into a sensor array, forming an epoxy layer over the sensor array.

11. The method of claim 10, wherein forming said optical fiber into a sensor array comprises wrapping said optical fiber around a hydrophone mandrel to form at least a portion of the sensor array.

12. The method of claim 10, wherein drawing over said buffer layer the outer jacketing layer comprises drawing over said buffer layer the outer jacketing layer having a thickness of about 100 microns to about 900 microns.

* * * * *

UNITED STATES PATENT AND TRADEMARK OFFICE
CERTIFICATE OF CORRECTION

PATENT NO.       : 7,327,907 B2
APPLICATION NO.  : 10/966751
DATED            : February 5, 2008
INVENTOR(S)      : Sanan Shaibani et al.

It is certified that error appears in the above-identified patent and that said Letters Patent is hereby corrected as shown below:

Column 4, line 15, after more delete "FRG's" and insert --FBG's--

Column 4, line 34, after fiber delete "They" and insert --they--

Signed and Sealed this

Seventeenth Day of June, 2008

JON W. DUDAS
*Director of the United States Patent and Trademark Office*